United States Patent
Kimura et al.

(10) Patent No.: US 10,710,925 B2
(45) Date of Patent: Jul. 14, 2020

(54) BOROSILICATE GLASS FOR PHARMACEUTICAL CONTAINER

(71) Applicant: NIPPON ELECTRIC GLASS CO., LTD., Otsu-shi, Shiga (JP)

(72) Inventors: Miki Kimura, Otsu (JP); Shinsaku Nishida, Otsu (JP); Ken Choju, Otsu (JP)

(73) Assignee: NIPPON ELECTRIC GLASS CO., LTD., Otsu-shi, Shiga (JP)

( * ) Notice: Subject to any disclaimer, the term of this patent is extended or adjusted under 35 U.S.C. 154(b) by 33 days.

(21) Appl. No.: 15/745,276

(22) PCT Filed: Jul. 8, 2016

(86) PCT No.: PCT/JP2016/070251
§ 371 (c)(1),
(2) Date: Jan. 16, 2018

(87) PCT Pub. No.: WO2017/014066
PCT Pub. Date: Jan. 26, 2017

(65) Prior Publication Data
US 2018/0208496 A1 Jul. 26, 2018

(30) Foreign Application Priority Data
Jul. 17, 2015 (JP) ................. 2015-142582

(51) Int. Cl.
C03C 3/091 (2006.01)
A61J 1/00 (2006.01)
C03C 4/20 (2006.01)
C03C 3/11 (2006.01)

(52) U.S. Cl.
CPC .............. *C03C 3/091* (2013.01); *A61J 1/00* (2013.01); *C03C 3/11* (2013.01); *C03C 4/20* (2013.01)

(58) Field of Classification Search
CPC ................................... C03C 3/091
See application file for complete search history.

(56) References Cited

U.S. PATENT DOCUMENTS

| | | |
|---|---|---|
| 4,870,034 A | 9/1989 | Kiefer |
| 5,547,904 A | 8/1996 | Watzke et al. |
| 2003/0087745 A1 | 5/2003 | Peuchert et al. |
| 2013/0327740 A1 * | 12/2013 | Adib ............. C03C 3/087 215/379 |
| 2014/0323287 A1 | 10/2014 | Tratzky et al. |
| 2015/0246846 A1 | 9/2015 | Choju et al. |
| 2018/0257975 A1 * | 9/2018 | Kimura ............. C03C 4/20 |

FOREIGN PATENT DOCUMENTS

| | | | |
|---|---|---|---|
| CA | 2193999 A1 | 10/1996 | |
| CN | 1155876 A | 7/1997 | |
| CN | 104619660 A | 5/2015 | |
| DE | 19515608 C1 * | 8/1996 | ............ C03C 3/093 |
| EP | A2-0297255 | 1/1989 | |
| EP | A1-2876092 | 5/2015 | |
| EP | A1-3190096 | 7/2017 | |
| JP | S64-18939 A | 1/1989 | |
| JP | S64-61330 A | 3/1989 | |
| JP | H07-187707 A | 7/1995 | |
| JP | 2004-504258 A | 2/2004 | |
| JP | 2014-37343 A | 2/2014 | |
| JP | 2014037343 A * | 2/2014 | ............ C03C 3/091 |
| JP | 2014-214084 A | 11/2014 | |
| WO | WO-2014014003 A1 * | 1/2014 | ............ C03C 3/091 |
| WO | WO-2014/021142 A1 | 2/2014 | |

OTHER PUBLICATIONS

Extended European Search Report dated Mar. 18, 2019 in corresponding European patent application 16827628.5 (8 pages).
Written Opinion dated Aug. 16, 2018 for PCT/JP2016/070251.
Sakka, Sumio, et al., "Glass Handbook," Asakusa Publishing Co., Ltd., 1975, pp. 545-548.
Volf, M. B., "Technical Approach to Glass," 1990, Glass Science and Technology 10, Elsevier.
International Search Report/Written Opinion dated Aug. 16, 2016 for PCT/JP2016/070251 [Japanese language].
International Search Report dated Aug. 16, 2016 for PCT/JP2016/070251.
The First Office Action dated Apr. 2, 2020 in Chinese Patent Application No. 201680042200.0 (6 pages) with an English translation (7 pages).
Notice of Reasons for Refusal dated May 13, 2020 in Japanese Patent Application No. 2017-529545 (5 pages) with an English translation (5 pages).

* cited by examiner

*Primary Examiner* — Elizabeth A. Bolden
(74) *Attorney, Agent, or Firm* — Faegre Drinker Biddle & Reath LLP

(57) ABSTRACT

A borosilicate glass for a pharmaceutical container includes $SiO_2$, $Al_2O_3$, $B_2O_3$, and $R_2O$ (R is one or more kinds selected from Li, Na, and K) as essential components, in which a content of CaO is equal to or greater than 0 and smaller than 0.5 mol %, a value of $(Na_2O+K_2O+Li_2O-Al_2O_3)/B_2O_3$ is 0.315 to 0.350 in terms of a molar ratio, and BaO is not substantially included.

16 Claims, 1 Drawing Sheet

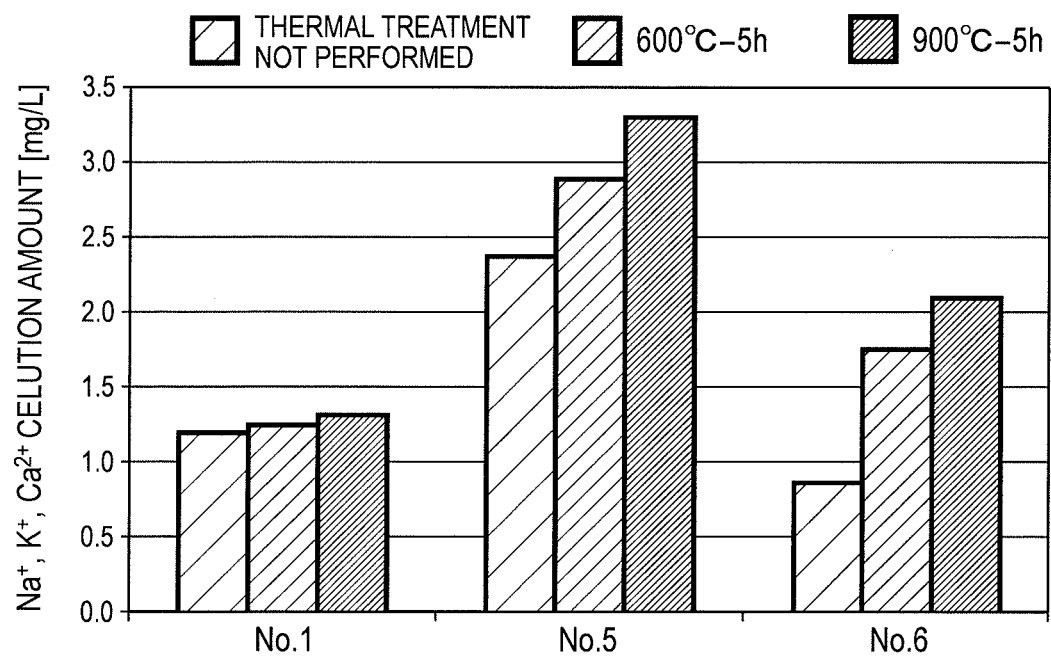

BOROSILICATE GLASS FOR PHARMACEUTICAL CONTAINER

TECHNICAL FIELD

The present invention relates to borosilicate glass for a pharmaceutical container to be used for a glass container such as a vial or an ampule, or a syringe of an injector.

BACKGROUND ART

The following characteristics are necessary for borosilicate glass for a pharmaceutical container such as a vial or an ampule.

(a) A component of an aqueous-based medicament present in the container and a glass component do not react with each other.

(b) Chemical durability and hydrolytic resistance are high so as not to contaminate an aqueous-based medicament present in the container, and is maintained even after various thermal treatments at the time of converting process.

(c) A linear thermal expansion is low such that breakage due to thermal shock does not occur in a production process of a glass tube and during converting process into a vial, an ampule and the like.

(d) A quantity of heat at the time of converting process into a vial, an ampule and the like can be decreased so that an inner surface of a container is not deteriorated due to an evaporant from glass, after the converting process.

A standard borosilicate glass for a pharmaceutical container satisfying these required characteristics includes $SiO_2$, $B_2O_3$, $Al_2O_3$, $Na_2O$, $K_2O$, CaO, BaO, and a small amount of a fining agent, as constituent components.

PRIOR ART DOCUMENTS

Patent Document

Patent Document 1: JP-A-2014-214084

Non Patent Document

Non Patent Document 1: M. B. Volf, Technical Approach to Glass, 1990, ELSEVIER

SUMMARY OF INVENTION

Problems that the Invention is to Solve

In recent years, development of aqueous-based medicaments present in containers has proceeded and aqueous-based medicaments having higher medical efficacy have been used. Among these aqueous-based medicaments, there is an aqueous-based medicament which is chemically unstable and easily denatured, and has high reactivity with glass. As a result, a glass having higher chemical durability or hydrolytic resistance than those in the related art is required for a borosilicate glass for a pharmaceutical container such as a vial or an ampule. In addition, in a case where a glass includes BaO, barium-feldspar crystals are easily precipitated and productivity is decreased due to a reaction with an alumina-based refractory at the time of glass melting, and Ba ions eluted from the glass may be reacted with sulfate ions in an aqueous-based medicament to generate an insoluble precipitate.

From such circumstances, in Patent Document 1, for example, proposed is a glass having high hydrolytic resistance without including BaO.

However, a pharmaceutical container such as a vial or an ampule is obtained by locally heating and processing tubular glass with a burner. At the time of performing the heating with a burner, $B_2O_3$ or $Na_2O$ in the glass is evaporated and condensed on an inner surface of a pharmaceutical container, and a heterogeneous layer is formed. Chemical durability and hydrolytic resistance of the glass is substantially lowered due to the formation of the heterogeneous layer, $B_2O_3$ or $Na_2O$ is eluted from the heterogeneous layer during the storage of the aqueous-based medicament or at the time of an autoclaving treatment after filling a container with the aqueous-based medicament, and alteration of a aqueous-based medicament component or a change in pH of the aqueous-based medicament easily occurs. In addition, the inner surface of the container is peeled off to cause generation of insoluble foreign materials, which are called flakes, in the aqueous-based medicament.

In Patent Document 1, a glass in which the amount of $K_2O$ added is adjusted in order to improve hydrolytic resistance is proposed. However, $K_2O$ is easily evaporated. In this configuration, an effect of preventing evaporation of $B_2O_3$ or $Na_2O$ cannot be expected. Accordingly, in the glass of Patent Document 1, $B_2O_3$ or $Na_2O$ is evaporated at the time of performing heating with a burner for processing of obtaining a pharmaceutical container, a heterogeneous layer is formed on the inner surface of the pharmaceutical container, $B_2O_3$ or $Na_2O$ is eluted from the heterogeneous layer, and thus, alternation of the aqueous-based medicament or an increase in pH of the aqueous-based medicament may occur. Further, flakes may be generated in the aqueous-based medicament.

Non Patent Document 1 discloses that it is important to set ranges of glass compositions to be in the ranges described below, in order to prevent chemical durability and hydrolytic resistance of glass from being lowered due to formation of the heterogeneous layer accompanied with the evaporation of $B_2O_3$ or $Na_2O$ in the glass and generation of flakes due to peeling of the inner surface of the container.

A value of $(Na_2O—Al_2O_3)/B_2O_3$ is 0.33 to 0.40 in terms of a molar ratio.

A value of $SiO_2/B_2O_3/(Na_2O)$ is smaller than 1.6 in terms of a molar ratio.

A value of Si/O is smaller than 0.4 in terms of a molar ratio.

However, even in a case where the glass compositions are in the ranges described above, it is difficult to prevent the formation of the heterogeneous layer at the time of converting process, and it is difficult to maintain excellent chemical durability and hydrolytic resistance after performing thermal treatment at the time of converting process.

An object of the present invention is to provide a borosilicate glass for a pharmaceutical container not including BaO, which has excellent chemical durability and hydrolytic resistance and in which excellent chemical durability and hydrolytic resistance may be maintained even after various thermal treatments at the time of converting process.

Means for Solving the Problems

The inventors have carried out various experiments and found that chemical durability and hydrolytic resistance of glass can be maintained, even after various thermal treatments at the time of converting process, in a case where a value of $(Na_2O+K_2O+Li_2O—Al_2O_3)/B_2O_3$ calculated from the glass compositions is set as 0.315 to 0.350 in terms of a molar ratio.

That is, a borosilicate glass for a pharmaceutical container according to the present invention is characterized by comprising: $SiO_2$, $Al_2O_3$, $B_2O_3$, and $R_2O$ (R is one or more kinds selected from Li, Na, and K) as essential components, in which a content of CaO is equal to or greater than 0 and smaller than 0.5 mol %, a value of $(Na_2O+K_2O+Li_2—Al_2O_3)/B_2O_3$ is 0.315 to 0.350 in terms of a molar ratio, and BaO is not substantially included. Here, a value of "$Na_2O+K_2O+Li_2O—Al_2O_3$" is a value obtained by subtracting a content of $Al_2O_3$ from the total content of $Na_2O$, $K_2O$, and $Li_2O$. The value of "$(Na_2O+K_2O+Li_2O—Al_2O_3)/B_2O_3$" indicates a value obtained by dividing the value of $(Na_2O+K_2O+Li_2O—Al_2O_3)$ by a content of $B_2O_3$. The expression "BaO is not substantially included" means that BaO is not positively added and does not mean that components mixed as impurities are excluded. More specifically, the expression means that the content of BaO is equal to or smaller than 0.05% in terms of mol %.

According to the configuration, since BaO is not included, barium-feldspar crystals are not precipitated due to a reaction between BaO and an alumina-based refractory at the time of glass melting or forming. In addition, a glass in which the amount of Ba ions eluted from the glass is small, and sulfate ions in an aqueous-based medicament and an insoluble precipitate are hardly formed, is obtained.

Further, it is possible to maintain excellent chemical durability and hydrolytic resistance, even after performing thermal treatment for converting process, that is, after processing of obtaining an aspect of a pharmaceutical container.

In the present invention, it is preferable that a value of $SiO_2/B_2O_3/(Na_2O+K_2O+Li_2O)$ is smaller than 1.6 in terms of a molar ratio. The value of "$SiO_2/B_2O_3/(Na_2O+K_2O+Li_2O)$" is a value obtained by dividing a content of $SiO_2$ by a content of $B_2O_3$, and then dividing this value by the total amount of contents of $Na_2O$, $K_2O$, and $Li_2O$.

According to the configuration, a processing temperature at the time of manufacturing a glass container such as an ampule or a vial from a glass tube may be decreased and the amount of $B_2O_3$ or an alkali metal oxide component evaporated from the glass can be significantly decreased. As a result, it is possible to maintain excellent chemical durability and hydrolytic resistance, even after various thermal treatments at the time of converting process.

In the present invention, it is preferable that a value of Si/O is smaller than 0.4 in terms of a molar ratio. The value of "Si/O" is a value obtained by dividing an amount of Si atoms in the glass by an amount of oxygen atoms of the oxides in the glass.

According to the configuration, a glass in which not only excellent chemical durability and hydrolytic resistance may be maintained, even after various thermal treatments at the time of converting process, but also generation of flakes hardly occurs, is obtained.

In the present invention, it is preferable that, in a glass grains test method of a hydrolytic resistance test based on EP 8.0, a consumption of 0.02 mol/L hydrochloric acid per unit glass mass is equal to or smaller than 0.030 mL/g.

In the present invention, it is preferable that, in an acid resistance test based on DIN12116, a weight loss per area is equal to or smaller than 1.0 $mg/dm^2$.

In the present invention, it is preferable that a working temperature is 1150° C. to 1250° C. The "working temperature" is a temperature at which viscosity of the glass is $10^4$ dPa·s.

According to the configuration, a processing temperature at the time of manufacturing a glass container such as an ampule or a vial from a glass tube may be decreased and the amount of $B_2O_3$ or an alkali metal oxide component evaporated from the glass may be significantly decreased. As a result, it is possible to prevent alternation of an aqueous-based medicament component stored in the glass container or an increase in pH of the aqueous-based medicament and generation of flakes.

In the present invention, it is preferable that liquidus viscosity is equal to or greater than $10^{4.5}$ dPa·s.

According to the configuration, it is preferable that devitrification at the time of forming hardly occurs, even in a case of using a Danner method for the forming of a glass tube.

A glass tube for a pharmaceutical container according to the present invention is characterized by comprising a borosilicate glass for a pharmaceutical container described above.

A pharmaceutical container according to the present invention is characterized by comprising a borosilicate glass for a pharmaceutical container described above.

BRIEF DESCRIPTION OF DRAWING

FIG. 1 is a graph showing an evaluation result of Example 2.

MODE FOR CARRYING OUT THE INVENTION

A borosilicate glass for a pharmaceutical container according to the present invention comprises $SiO_2$, $Al_2O_3$, $B_2O_3$, and $R_2O$ (R is one or more kinds selected from Li, Na, and K) as essential components.

The borosilicate glass for a pharmaceutical container according to the present invention does not substantially include BaO. In a case where BaO is included in a glass composition, there may be a possibility that crystals are precipitated or a precipitate is generated due to a reaction with an alumina-based refractory or a reaction with sulfate ions in an aqueous-based medicament as described above.

In the borosilicate glass for a pharmaceutical container according to the invention, a value of $(Na_2O+K_2O+Li_2O—Al_2O_3))/B_2O_3$ is 0.315 to 0.350, preferably 0.320 to 0.345, 0.320 to 0.340, and particularly preferably equal to or greater than 0.325 and smaller than 0.340 in terms of a molar ratio, in order to obtain a glass having high hydrolytic resistance. In a case where this value is excessively great, the content of alkali metal oxides such as $Na_2O$, $K_2O$, and $Li_2O$ increases, and in a case of performing various thermal treatments for processing of obtaining a pharmaceutical container, the amount of these components evaporated from the glass increases. As a result, chemical durability or hydrolytic resistance of the glass decreases. In addition, a content of $B_2O_3$ decreases, and accordingly, a working temperature increases. As a result, due to various thermal treatments at the time of processing, the alkali metal oxides such as $Na_2O$, $K_2O$, and $Li_2O$ are easily evaporated and chemical durability and hydrolytic resistance decreases. In a case where this value is excessively small, the content of the alkali metal oxides such as $Na_2O$, $K_2O$, and $Li_2O$ is decreased, and accordingly, the working temperature increases. As a result, due to various thermal treatments at the time of processing of obtaining a pharmaceutical container, $Na_2O$, $K_2O$, $Li_2O$, or $B_2O_3$ is easily evaporated from the glass, and chemical durability and hydrolytic resistance decreases. In addition, since the content of $B_2O_3$ increases, chemical durability or hydrolytic resistance decreases, before the time of converting process.

In the borosilicate glass for a pharmaceutical container according to the present invention, the content of CaO is limited to be 0 and smaller than 0.5 mol %. CaO has an effect of decreasing a high-temperature viscosity of glass, but in a case where the content of CaO is excessively great, hydrolytic resistance decreases. The content of CaO is preferably 0 to 0.4 mol % and particularly 0.1 to 0.4 mol %.

In the present invention, a value of $SiO_2/B_2O_3/(Na_2O+K_2O+Li_2O)$ is preferably smaller than 1.6, more preferably equal to or greater than 0.5 and smaller than 1.4 in terms of a molar ratio, and particularly preferably equal to or greater than 1.0 and smaller than 1.2. In a case where this value is excessively great, devitrification of glass easily occurs and productivity decreases. In a case where this value is excessively small, chemical durability or hydrolytic resistance decreases.

In the present invention, in order to obtain a glass having high hydrolytic resistance, a value of Si/O is preferably equal to or smaller than 0.4, more preferably equal to or greater than 0.1 and smaller than 0.4, and particularly preferably equal to or greater than 0.3 and smaller than 0.39 in terms of a molar ratio. In a case where this value is excessively great, a working temperature increases, $Na_2O$, $K_2O$, $Li_2O$, or $B_2O_3$ is easily evaporated due to various thermal treatments at the time of processing, and chemical durability or hydrolytic resistance decreases. In addition, flakes are easily generated.

In the present invention, a value of $(SiO_2+Al_2O_3+B_2O_3)/(Na_2O+K_2O+Li_2O+CaO+MgO)$ representing an acidity of glass is preferably 10 to 12 and particularly preferably 10.5 to 12 in terms of a molar ratio. In a case where this value is excessively great, a working temperature increases, $Na_2O$, $K_2O$, $Li_2O$, or $B_2O_3$ is easily evaporated due to various thermal treatments at the time of processing, and chemical durability or hydrolytic resistance decreases. In a case where this value is excessively small, chemical durability and hydrolytic resistance decreases, before the time of converting process. The value of "$(SiO_2+Al_2O_3+B_2O_3)/(Na_2O+K_2O+Li_2O+CaO+MgO)$" is a value obtained by dividing the total amount of the contents of $SiO_2$, $Al_2O_3$, and $B_2O_3$ by the total amount of the contents of $Na_2O$, $K_2O$, $Li_2O$, CaO, and MgO.

In the present invention, a value of $Al_2O_3/SiO_2$ is preferably 0.053 to 0.059, 0.054 to 0.058, and particularly preferably 0.055 to 0.059 in terms of a molar ratio. In a case where this value is excessively small, a liquidus temperature increases and devitrification easily occurs at the time of forming. In a case where this value is excessively great, a working temperature increases. As a result, $Na_2O$, $K_2O$, $Li_2O$, or $B_2O_3$ is easily evaporated due to various thermal treatments at the time of processing, and chemical durability or hydrolytic resistance decreases. A value "$Al_2O_3/SiO_2$" is a value obtained by dividing the content of $Al_2O_3$ by the content of $SiO_2$.

A composition of the borosilicate glass for a pharmaceutical container according to the present invention is not limited, as long as the conditions described above are satisfied, and a glass including 75% to 80% of $SiO_2$, 3% to 6% of $Al_2O_3$, 8% to 12% of $B_2O_3$, 2% to 8% of $Na_2O$, 0% to 5% of $K_2O$, equal to or greater than 0 and less than 0.2% of $Li_2O$, and equal to or greater than 0 and less than 0.5% of CaO, in terms of mol %, as a glass composition, and substantially not including BaO may be used, for example.

Hereinafter, a reason for limiting the range of the composition of each component as described above will be described. In the following description, the expression "%" means mol %, unless otherwise noted.

$SiO_2$ is one of the components configuring a glass network. The content of $SiO_2$ is preferably 75% to 80%, 76% to 80%, and particularly preferably 76.5% to 79%. In a case where the content of $SiO_2$ is excessively small, chemical durability decreases, and acid resistance required for the borosilicate glass for a pharmaceutical container decreases. On the other hand, in a case where the content of $SiO_2$ is excessively great, liquidus viscosity decreases, devitrification easily occurs in the manufacturing step, thereby decreasing productivity. In addition, a working temperature increases.

$Al_2O_3$ is a component which prevents devitrification of the glass and improves chemical durability and hydrolytic resistance. The content of $Al_2O_3$ is preferably 3% to 6%, 3% to 5.5%, 3% to 5%, and particularly preferably 3.5% to 5%. In a case where the content of $Al_2O_3$ is excessively small, the effects described above are not obtained. On the other hand, in a case where the content of $Al_2O_3$ is excessively great, a working temperature increases.

$B_2O_3$ has effects of not only decreasing a melting point of the glass, but also increasing a liquidus viscosity, and preventing devitrification. Accordingly, the content of $B_2O_3$ is preferably 8% to 12%, 8% to 11.5%, 8% to 11%, and particularly preferably 8.5% to 11%. In a case where the content of $B_2O_3$ is excessively small, a working temperature increases. On the other hand, in a case where the content of $B_2O_3$ is excessively great, hydrolytic resistance or chemical durability decreases.

$Na_2O$ has effects of decreasing viscosity of the glass and increasing a coefficient of linear thermal expansion. The content of $Na_2O$ is preferably 2% to 8%, 3% to 8%, 4% to 7%, and particularly preferably 5% to 7%. In a case where the content of $Na_2O$ is excessively small, a working temperature increases. On the other hand, in a case where the content of $Na_2O$ is excessively great, hydrolytic resistance decreases.

$K_2O$ has effects of decreasing viscosity of the glass and increasing a coefficient of linear thermal expansion, in the same manner as $Na_2O$. The content of $K_2O$ is preferably 0% to 5%, 0.5% to 4%, and particularly preferably 0.5% to 3%. In a case where the content of $K_2O$ is excessively great, hydrolytic resistance decreases.

It is desired that both components of $K_2O$ and $Na_2O$ are used together, because hydrolytic resistance is improved due to a mixed alkali effect.

$Li_2O$ has effects of decreasing viscosity of the glass and increasing a coefficient of linear thermal expansion, in the same manner as $Na_2O$ and $K_2O$. However, in a case where $Li_2O$ is added, a refractory easily corrodes at the time of glass melting. In addition, in a case where $Li_2O$ is added, production cost increases. Accordingly, the content of $Li_2O$ is preferably equal to or greater than 0% and smaller than 0.2%, 0% to 0.1%, 0% to 0.05%, and particularly preferably 0% to 0.01%. Unless there are special circumstances, other alkali metal oxides other than $Li_2O$ are desirably used.

The content of CaO is 0% to 0.5%. The reason for limiting the content of CaO and a preferred range thereof are as described above.

In the present invention, various components can be added, in addition to the components described above.

MgO has an effect of improving chemical durability. The content of MgO is preferably equal to or greater than 0% and smaller than 4%, 0% to 2%, and particularly preferably 0% to 1%. In a case where the content of MgO is excessively great, hydrolytic resistance decreases.

SrO has an effect of improving chemical durability. The content of SrO is preferably equal to or greater than 0% and smaller than 4%, 0% to 2%, and particularly preferably 0% to 1%. In a case where the content of SrO is excessively great, hydrolytic resistance decreases. $TiO_2$ has an effect of improving hydrolytic resistance. The content of $TiO_2$ is preferably equal to or greater than 0% and smaller than 5%, 0% to 4%, and particularly preferably 0% to 1.5%. In a case where the content of $TiO_2$ is excessively great, a working temperature increases. $ZrO_2$ has an effect of improving hydrolytic resistance. The content of $ZrO_2$ is preferably equal to or greater than 0% and smaller than 5%, 0% to 4%, and particularly preferably 0% to 1.5%. In a case where the content of $ZrO_2$ is excessively great, a working temperature increases. $Fe_2O_3$ may cause coloring of glass to decrease transmittance in a visible range, and therefore, the content thereof is desirably equal to or smaller than 0.2%, equal to or smaller than 0.1%, and particularly desirably limited to be equal to or smaller than 0.02%. One or more kinds of F, Cl, $Sb_2O_3$, $SnO_2$, and $Na_2SO_4$ may be included as fining agents. The total content of these fining agents is preferably equal to or smaller than 0.5%, equal to or smaller than 0.4%, and particularly preferably equal to or smaller than 0.3%. Cl or $SnO_2$ is preferably used in these fining agents, because the degree of effect on the melting temperature and the environment is small. In a case of using Cl, the content thereof is preferably equal to or smaller than 0.5%, equal to or smaller than 0.4%, and particularly preferably equal to or smaller than 0.2%. In a case of using $SnO_2$, the content thereof is preferably equal to or smaller than 0.5%, equal to or smaller than 0.4%, and particularly preferably 0.01% to 0.3%. The borosilicate glass for a pharmaceutical container preferably has the following characteristics. In a glass grains test method of a hydrolytic resistance test based on EP 8.0, a consumption of 0.02 mol/L hydrochloric acid per unit glass mass is preferably equal to or smaller than 0.030 mL/g, equal to or smaller than 0.028 mL/g, equal to or smaller than 0.026 mL/g, and particularly preferably equal to or smaller than 0.025 mL/g. In a case where the consumption of hydrochloric acid is excessively great, the amount of glass components, particularly alkali components eluted may significantly increase to cause alternation of aqueous-based medicament components, at the time of manufacturing a pharmaceutical container such as an ampule or a vial, filling the pharmaceutical container with an aqueous-based medicament, and storing the aqueous-based medicament. In an acid resistance test based on DIN12116, a weight loss per area is preferably equal to or smaller than 1.0 $mg/dm^2$ and particularly preferably equal to or smaller than 0.8 $mg/dm^2$. In a case where the weight loss decrease is excessively great, the amount of glass components eluted may significantly increase to cause alternation of aqueous-based medicament components, at the time of manufacturing a pharmaceutical container such as an ampule or a vial, filling the pharmaceutical container with an aqueous-based medicament, and storing the aqueous-based medicament. The working temperature is equal to or lower than 1250° C., 1150° C. to 1250° C., more preferably 1150° C. to 1240° C., and particularly preferably 1160° C. to 1230° C. In a case where the working temperature is excessively high, a processing temperature in a case of manufacturing a glass container such as an ampule or a vial from a glass tube increases, and the amount of $B_2O_3$ or $Na_2O$ in the glass evaporated significantly increases. The evaporated components are attached to an inner surface of a glass container, and eluted during the storage of the aqueous-based medicament or at the time of an autoclaving treatment after filling the container with the aqueous-based medicament, and this causes alternation of an aqueous-based medicament component or an increase in pH of the aqueous-based medicament. The liquidus viscosity is preferably equal to or greater than $10^{4.5}$ dPa·s, equal to or greater than $10^{5.0}$ dPa·s, equal to or greater than $10^{5.2}$ dPa·s, equal to or greater than $10^{5.4}$ dPa·s, and particularly preferably equal to or greater than $10^{5.6}$ dPa·s. In a case where the liquidus viscosity decreases, devitrification easily occurs at the time of glass tube forming using a Danner method, and productivity decreases. A coefficient of linear thermal expansion is an important parameter for thermal shock resistance of glass. In order for the glass to have sufficient thermal shock resistance, the coefficient of linear thermal expansion in a temperature range of 30° C. to 380° C. is preferably equal to or smaller than $58\times10^{-7}$/° C. and particularly preferably 48 to $55\times10^{-7}$/° C. Next, a method for manufacturing a glass tube for a pharmaceutical container of the invention will be described. In the following description, a Danner method is used as an example. First, a glass batch is prepared by mixing glass raw materials with each other, so as to have the glass composition described above. Next, the glass batch is continuously put into a melting furnace at 1550° C. to 1700° C., to be melted and fined. Then, the obtained molten glass is drawn out in a tubular shape from a tip end portion of a rotating refractory, while winding the molten glass around the rotating refractory and blowing air from the tip end portion of the refractory. The drawn tubular glass is cut to have a predetermined length and a glass tube for a pharmaceutical container is obtained. The glass tube obtained as described above is supplied for the manufacturing of a pharmaceutical container such as a vial or an ampule. The glass tube for a pharmaceutical container of the invention is not limited to be manufactured by the Danner method, and may be manufactured by using an arbitrary method which is well known in the related art. For example, a bellow method or a down-draw method is also an effective method as the manufacturing method of the glass tube for a pharmaceutical container of the invention.

EXAMPLES Hereinafter, the invention will be described with reference to examples.

Example 1 Table 1 shows examples of the invention (Sample Nos. 1 to 4) and comparative examples (sample Nos. 5 and 6).

TABLE 1

|  | 1 | 2 | 3 | 4 | 5 | 6 |
|---|---|---|---|---|---|---|
| $SiO_2$ | 77.8 | 77.8 | 78.0 | 77.8 | 78.7 | 82.0 |
| $Al_2O_3$ | 4.4 | 4.4 | 4.4 | 4.5 | 3.3 | 1.8 |
| $B_2O_3$ | 9.7 | 9.7 | 9.6 | 9.7 | 9.5 | 11.6 |
| $Li_2O$ | 0.0 | 0.0 | 0.0 | 0.0 | 0.0 | 0.0 |
| $Na_2O$ | 6.2 | 6.2 | 6.3 | 6.1 | 6.9 | 4.0 |
| $K_2O$ | 1.5 | 1.5 | 1.4 | 1.5 | 0.1 | 0.4 |
| BaO | 0.0 | 0.0 | 0.0 | 0.0 | 0.0 | 0.0 |
| MgO | 0.0 | 0.0 | 0.0 | 0.0 | 0.0 | 0.0 |
| CaO | 0.3 | 0.3 | 0.1 | 0.3 | 1.5 | 0.0 |

TABLE 1-continued

|  | 1 | 2 | 3 | 4 | 5 | 6 |
|---|---|---|---|---|---|---|
| F | 0.00 | 0.00 | 0.00 | 0.00 | 0.56 | 0.20 |
| Cl | 0.00 | 0.13 | 0.13 | 0.00 | 0.00 | 0.11 |
| $TiO_2$ | 0.0 | 0.0 | 0.0 | 0.0 | 0.0 | 0.0 |
| $ZrO_2$ | 0.0 | 0.0 | 0.0 | 0.0 | 0.0 | 0.0 |
| $SnO_2$ | 0.08 | 0.00 | 0.08 | 0.08 | 0.00 | 0.00 |
| $Fe_2O_3$ | 0.006 | 0.006 | 0.006 | 0.006 | 0.009 | 0.006 |
| $(Na_2O + K_2O + Li_2O—Al_2O_3)/B_2O_3$ | 0.332 | 0.332 | 0.332 | 0.325 | 0.383 | 0.222 |
| Si/O | 0.38 | 0.38 | 0.38 | 0.38 | 0.39 | 0.39 |
| $SiO_2/B_2O_3/(Na_2O + K_2O + Li_2O)$ | 1.1 | 1.1 | 1.1 | 1.1 | 1.2 | 1.6 |
| $(SiO_2 + Al_2O_3 + B_2O_3)/$ $(Na_2O + K_2O + Li_2O + CaO + MgO)$ | 11.5 | 11.5 | 11.9 | 11.5 | 10.8 | 21.6 |
| $Al_2O_3/SiO_2$ | 0.057 | 0.057 | 0.057 | 0.058 | 0.042 | 0.022 |
| Coefficient of thermal expansion ($\times 10^{-7}/°$ C.) | 53.6 | 53.6 | 53.6 | 53.6 | 49.0 | 32.3 |
| Strain point (° C.) | 522 | 522 | 522 | 522 | 524 | 495 |
| Annealing point (° C.) | 568 | 568 | 568 | 568 | 566 | 548 |
| Softening point (° C.) | 795 | 795 | 795 | 795 | 780 | 815 |
| Working temperature (° C.) | 1187 | 1187 | 1190 | 1194 | 1161 | 1259 |
| Liquidus temperature (° C.) | 940 | 940 | 940 | 932 | 1030 | 1020 |
| Liquidus viscosity (dPa · s) | $10^{5.8}$ | $10^{5.8}$ | $10^{5.8}$ | $10^{5.8}$ | $10^{4.8}$ | $10^{5.5}$ |
| Hydrolytic resistance (mL/g) | 0.022 | 0.022 | 0.021 | 0.021 | 0.035 | 0.018 |
| Acid resistance (mg/dm$^2$) | 0.6 | 0.6 | 0.6 | 0.5 | — | — |
| Sn elution amount (mg/L) | Not detected | — | Not detected | Not detected | — | — |

Each sample was prepared as described below.

First, 500 g of a glass batch was prepared so as to have the composition shown in the table, and melted by using a platinum crucible at 1650° C. for 4 hours. Stirring was performed twice during melting, in order to remove bubbles in the melt. After melting, an ingot was prepared, processed to have a shape necessary for measurement, and supplied for various evaluations.

As shown in Table 1, regarding Sample Nos. 1 to 4, the value of $(Na_2O+K_2O+Li_2O—Al_2O_3)/B_2O_3$ was in the range of the present invention and hydrolytic resistance was high. Regarding Sample Nos. 1, 3, and 4 including Sn in the glass composition, in a case where elution of Sn was evaluated by a hydrolytic resistance test, the amount of elution of Sn was smaller than a detection limit in any case of the samples.

On the other hand, regarding Sample No. 5 which is a comparative example, the value of $(Na_2O+K_2O+Li_2O—Al_2O_3)/B_2O_3$ was excessively great, and therefore, hydrolytic resistance was low. Regarding Sample No. 6, the value of $(Na_2O+K_2O+Li_2O—Al_2O_3)/B_2O_3$ was excessively small, and therefore, the working temperature was high.

The measurement of the coefficient of linear thermal expansion was performed by using glass samples formed in a rod shape having a size of approximately 5 mmϕ×50 mm by a dilatometer in a temperature range of 30° C. to 380° C.

The measurement of a strain point, an annealing point, and a softening point was performed by a fiber elongation method.

Regarding the working temperature, a viscosity curve of glass was obtained from high-temperature viscosity obtained by a platinum ball pulling method and a viscosity calculation formula of Fulcher, and a temperature corresponding to viscosity of $10^4$ dPa·s was obtained from the viscosity curve.

In the measurement of the liquidus temperature, a platinum boat having a size of approximately 120×20×10 mm was filled with a pulverized glass sample and was put into an electric furnace having a linear temperature gradient for 24 hours. After that, a crystal precipitation portion was specified by microscope observation, a temperature corresponding to the crystal precipitation portion was calculated from a temperature gradient graph of the electric furnace, and this temperature was set as the liquidus temperature.

In the calculation of the liquidus viscosity, a viscosity curve of glass was obtained from a strain point, an annealing point, a softening point, a working temperature, and a viscosity calculation formula of Fulcher, the viscosity of the glass at the liquidus temperature was calculated from this viscosity curve, and this viscosity was set as the liquidus viscosity.

The hydrolytic resistance test was performed by a method of pulverizing a sample by using a mortar and a pestle made of alumina, based on a glass grains test method of EP 8.0. The specific test procedure is as follows. A surface of a sample was carefully wiped with ethanol, the sample was pulverized by using a mortar and a pestle made of alumina, and the sample was classified by using three stainless steel sieves respectively having an aperture of 710 μm, 425 μm, and 300 μm. The sample powder remaining on the sieves was pulverized again and subjected to the same sieving operation. The sample powder remaining on the sieve having an aperture of 300 μm was washed with pure water and put into a glass container such as a beaker. After that, an operation of adding and stirring ethanol, washing the sample by an ultrasonic washing machine for 1 minute, and drawing only a supernatant was performed six times. Then, the sample was dried in an oven at 110° C. for 30 minutes and cooled in a desiccator for 30 minutes. 10 g of the obtained sample powder was weighed with a precision of ±0.0001 g by using an electronic balance, and was put in a 250 mL quartz flask, and 50 mL of extra pure water was added thereto. After sealing the flask tightly, the flask was put in an autoclave and stored at 121° C. for 30 minutes. The temperature was increased from 100° C. to 121° C. at 1° C./min and was decreased from 121° C. to 100° C. at 2° C./min. After performing cooling to 95° C., the sample was extracted into a conical beaker. An operation of washing the inside of the flask with 30 mL of extra pure water and running the extra pure water into the conical beaker was performed three times. Approximately 0.05 mL of methyl red was added dropwise to a solution after the test, neutralization titration was performed with hydrochloric acid having a concentration of 0.02 mol/L, the consumption of hydrochloric acid was recorded, and the consumption of hydrochloric acid per 1 g of the sample glass was calculated. As this value is small, hydrolytic resistance is high.

The acid resistance test was performed by setting a sample surface area as 50 cm², and a liquid amount of hydrochloric acid having a concentration of 6 mol/L which is an eluate as 800 mL, based on DIN12116. The specific test procedure is as follows. First, a glass sample piece including surfaces, all of which are obtained by mirror polishing finish and having a total surface area of 50 cm² was prepared, and the sample was dipped in a solution obtained by mixing hydrofluoric acid (40 mass %) and hydrochloric acid (2 mol/L) so as to have a volume ratio of 1:9, as pretreatment, and stirred with a magnetic stirrer for 10 minutes. Next, the sample piece was extracted, ultrasonic cleaning for 2 minutes was performed with extra pure water three times, and then, ultrasonic cleaning was performed in ethanol for 1 minute twice. Then, the sample piece was dried in an oven at 110° C. for 1 hour and cooled in a desiccator for 30 minutes. A mass $m_1$ of the sample piece obtained as described above was measured with a precision of ±0.1 mg, and recorded. Then, 800 mL of hydrochloric acid having a concentration of 6 mol/L was put in a beaker made of quartz glass, and heated until the boiling occurs by using an electric heater, and the sample piece was hung with a platinum line and stored for 6 hours. In order to prevent a decrease in the liquid amount during the test, an opening of a cover of a container was plugged up with a gasket and a cooling tube. After that, the sample piece was extracted, ultrasonic cleaning for 2 minutes was performed with extra pure water three times, and then, ultrasonic cleaning was performed in ethanol for 1 minute twice. The washed sample piece was dried in an oven at 110° C. for 1 hour and cooled in a desiccator for 30 minutes. A mass piece $m_2$ of the sample treated as described above was measured with a precision of ±0.1 mg, and recorded. Finally, the weight loss per unit area was calculated from the masses $m_1$ and $m_2$ mg of the sample before and after putting the sample into boiling hydrochloric acid and the total surface area Acm² of the sample by Equation 1, and was set as a measurement value of the acid resistance test.

$$\text{Weight loss per unit area} = 100 \times (m_1 - m_2) / 2 \times A \quad [\text{Equation 1}]$$

The amount of elution of Sn was analyzed regarding a test solution after the hydrolytic resistance test by using an ICP emission spectrometry device (manufactured by Varian). The specific test procedure is as described below. The sample solution after the hydrolytic resistance test was filtered with a membrane filter and collected with a centrifuge tube. A standard solution of Sn (manufactured by Wako Pure Chemical Industries, Ltd.) was diluted so that the content of Sn becomes 0 mg/L, 0.05 mg/L, 0.5 mg/L, and 1.0 mg/L, and standard solutions were prepared. A calibration curve was created from these standard solutions and the amount of elution of Sn in the test solution was calculated. A measurement wavelength of Sn was 189.925 nm.

Example 2

Next, the hydrolytic resistance after thermal treatment was evaluated. Table 2 shows results of evaluation performed by using Sample Nos. 1, 5, and 6 of Table 1.

TABLE 2

|  | Thermal treatment not performed | 600° C.-5 h | 900° C.-5 h |
|---|---|---|---|
| No. 1 | 1.2 | 1.3 | 1.3 |
| No. 5 | 2.4 | 2.9 | 3.3 |
| No. 6 | 0.9 | 1.8 | 2.1 |

Sample Nos. 1, 5, and 6 were prepared by the same method as in Example 1. Next, each ingot-like sample was subjected to thermal treatment in an electric furnace at 600° C. or 900° C. for 5 hours. With the temperatures of 600° C. and 900° C., temperatures of various thermal treatments at the time of converting processing to a pharmaceutical container were assumed. Regarding the sample before and after the thermal treatment, the hydrolytic resistance test was performed, and the amount of elution of $Na^+$, $K^+$, and $Ca^{2+}$ in the obtained eluate was measured. The small amount of elution of $Na^+$, $K^+$, and $Ca^{2+}$ indicates high hydrolytic resistance. Evaluation results are shown in FIG. 1. It was confirmed that, in Sample Nos. 5 and 6, the amount of elution of $Na^+$, $K^+$, and $Ca^{2+}$ increases together with the thermal treatment, and hydrolytic resistance decreases, but in Sample No. 1, a change in the amount of elution of $Na^+$, $K^+$, and $Ca^{2+}$ accompanied with the thermal treatment was small and excellent hydrolytic resistance was maintained.

INDUSTRIAL APPLICABILITY

A borosilicate glass for a pharmaceutical container according to the present invention can be suitably used as a material for various pharmaceutical containers such as an ampule, a vial, a prefilled syringe, and a cartridge.

The invention claimed is:

1. A borosilicate glass for a pharmaceutical container, comprising:
    $SiO_2$, $Al_2O_3$, $B_2O_3$, and $R_2O$, wherein R is selected from the group consisting of Li, Na, and K, as essential components,
    wherein a content of CaO is equal to or greater than 0 and smaller than 0.5 mol %,
    wherein a value of $(Na_2O+K_2O+Li_2O\ Al_2O_3)/B_2O_3$ is 0.315 to 0.350 in terms of a molar ratio,
    wherein BaO is not substantially included, and
    wherein a value of $(SiO_2+Al_2O_3+B_2O_3)/(Na_2O+K_2O+Li_2O+CaO+MgO)$ is 10 to 12 in terms of a molar ratio.

2. The borosilicate glass for a pharmaceutical container according to claim 1,
    wherein a value of $SiO_2/B_2O_3/(Na_2O+K_2O+Li_2O)$ is smaller than 1.6 in terms of a molar ratio.

3. The borosilicate glass for a pharmaceutical container according to claim 1,
    wherein a value of Si/O is smaller than 0.4 in terms of a molar ratio.

4. The borosilicate glass for a pharmaceutical container according to claim 1,
    wherein, in a glass grains test method of a hydrolytic resistance test based on EP 8.0, a consumption of 0.02 mol/L hydrochloric acid per unit glass mass is equal to or smaller than 0.030 mL.

5. The borosilicate glass for a pharmaceutical container according to claim 1,
    wherein, in an acid resistance test based on DIN12116, a weight loss per area is equal to or smaller than 1.0 mg/dm².

6. The borosilicate glass for a pharmaceutical container according to claim 1,
    wherein a working temperature is 1150° C. to 1250° C.

7. The borosilicate glass for a pharmaceutical container according to claim 1,
    wherein a liquidus viscosity is equal to or greater than $10^{4.5}$ dPa·s.

8. A glass tube for a pharmaceutical container, comprising a borosilicate glass for a pharmaceutical container according to claim 1.

9. A pharmaceutical container comprising a borosilicate glass for a pharmaceutical container according to claim 1.

10. The borosilicate glass for a pharmaceutical container according to claim 1,
wherein a value of a molar ratio of $Al_2O_3/SiO_2$ is 0.053 to 0.059.

11. The borosilicate glass for a pharmaceutical container according to claim 1,
wherein the borosilicate glass comprises as a glass composition, in terms of mol %, 75% to 80% of $SiO_2$, 3% to 6% of $Al_2O_3$, 8% to 12% of $B_2O_3$, 2% to 8% of $Na_2O$, 0% to 5% of $K_2O$, equal to or greater than 0 and less than 0.2% of $Li_2O$, and equal to or greater than 0 and less than 0.5% of CaO, in terms of mol %, and substantially does not include BaO.

12. A borosilicate glass for a pharmaceutical container, comprising:
$SiO_2$, $Al_2O_3$, $B_2O_3$, and $R_2O$, wherein R is selected from the group consisting of Li, Na, and K, as essential components,
wherein a content of CaO is equal to or greater than 0 and smaller than 0.5 mol %,
a value of $(Na_2O+K_2O+Li_2O-Al_2O_3)/B_2O_3$ is 0.315 to 0.350 in terms of a molar ratio,
wherein BaO is not substantially included,
wherein a value of $SiO_2/B_2O_3/(Na_2O+K_2O+Li_2O)$ is smaller than 1.6 in terms of a molar ratio,
wherein a value of Si/O is smaller than 0.4 in terms of a molar ratio, and
wherein a value of $(SiO_2+Al_2O_3+B_2O_3)/(Na_2O+K_2O+Li_2O+CaO+MgO)$ is 10 to 12 in terms of a molar ratio.

13. The borosilicate glass for a pharmaceutical container according to claim 12,
wherein a value of a molar ratio of $Al_2O_3/SiO_2$ is 0.053 to 0.059.

14. The borosilicate glass for a pharmaceutical container according to claim 12,
wherein the borosilicate glass comprises as a glass composition, in terms of mol %, 75% to 80% of $SiO_2$, 3% to 6% of $Al_2O_3$, 8% to 12% of $B_2O_3$, 2% to 8% of $Na_2O$, 0% to 5% of $K_2O$, equal to or greater than 0 and less than 0.2% of $Li_2O$, and equal to or greater than 0 and less than 0.5% of CaO, in terms of mol %, and substantially does not include BaO.

15. A borosilicate glass for a pharmaceutical container, comprising:
$SiO_2$, $Al_2O_3$, $B_2O_3$, and $R_2O$, wherein R is selected from the group consisting of Li, Na, and K, as essential components,
wherein a content of CaO is equal to or greater than 0 and smaller than 0.5 mol %,
wherein a value of $(Na_2O+K_2O+Li_2O-Al_2O_3)/B_2O_3$ is 0.315 to 0.350 in terms of a molar ratio,
wherein BaO is not substantially included,
wherein a value of $SiO_2/B_2O_3/(Na_2O+K_2O+Li_2O)$ is smaller than 1.6 in terms of a molar ratio,
wherein a value of Si/O is smaller than 0.4 in terms of a molar ratio,
wherein a value of a molar ratio of $Al_2O_3/SiO_2$ is 0.053 to 0.059, and
wherein a value of $(SiO_2+Al_2O_3+B_2O_3)/(Na_2O+K_2O+Li_2O+CaO+MgO)$ is 10 to 12 in terms of a molar ratio.

16. The borosilicate glass for a pharmaceutical container according to claim 15,
wherein the borosilicate glass comprises as a glass composition, in terms of mol %, 75% to 80% of $SiO_2$, 3% to 6% of $Al_2O_3$, 8% to 12% of $B_2O_3$, 2% to 8% of $Na_2O$, 0% to 5% of $K_2O$, equal to or greater than 0 and less than 0.2% of $Li_2O$, and equal to or greater than 0 and less than 0.5% of CaO, in terms of mol %, and substantially does not include BaO.

* * * * *